United States Patent [19]
Tatsuno

[11] Patent Number: 5,666,230
[45] Date of Patent: *Sep. 9, 1997

[54] ZOOM LENS

[75] Inventor: Wataru Tatsuno, Yokohama, Japan

[73] Assignee: Nikon Corporation, Tokyo, Japan

[*] Notice: The term of this patent shall not extend beyond the expiration date of Pat. No. 5,276,553.

[21] Appl. No.: 995,414

[22] Filed: Dec. 18, 1992

[30] Foreign Application Priority Data

Dec. 25, 1991 [JP] Japan .................................. 3-342607

[51] Int. Cl.⁶ .................................................. G02B 15/14
[52] U.S. Cl. ........................................... 359/684; 359/686
[58] Field of Search ..................................... 359/684, 686

[56] References Cited

U.S. PATENT DOCUMENTS

| | | | |
|---|---|---|---|
| 3,152,210 | 10/1964 | Gustafson | 359/686 |
| 4,110,006 | 8/1978 | Ikemori | 359/684 |
| 4,223,981 | 9/1980 | Mizutani et al. | 359/683 |
| 4,636,040 | 1/1987 | Tokumaru | 359/684 |
| 4,840,468 | 6/1989 | Tanaka | 359/684 |
| 5,272,564 | 12/1993 | Suzuki et al. | 359/686 |
| 5,276,553 | 1/1994 | Tatsuno | 359/686 |

FOREIGN PATENT DOCUMENTS

| | | |
|---|---|---|
| 3027558 | 2/1981 | Germany . |
| 52-109952 | 9/1977 | Japan . |
| 56-21112 | 2/1981 | Japan . |
| 57-4018 | 1/1982 | Japan . |
| 1-204013 | 8/1989 | Japan . |

OTHER PUBLICATIONS

Patent Abstracts of Japan, vol. 9, No. 236 (P-390), Sep. 21, 1985.

*Primary Examiner*—Scott J. Sugarman
*Attorney, Agent, or Firm*—Shapiro and Shapiro

[57] ABSTRACT

A zoom lens includes at least two lens groups, i.e., a first lens group and a second lens group. The second lens group includes a first sub-group near to the first lens group and a second sub-group far from the first lens group, and the first lens group and the first sub-group in the second lens group together form a substantially afocal system in at least a portion of a zooming range. In the zoom lens, focusing is effected by the first sub-group in the second lens group being moved along the optical axis. Considering a case where this zoom lens is applied for auto focusing, it is preferable that the first lens group be disposed on that side in the lens group which is most adjacent to the object side.

8 Claims, 2 Drawing Sheets

ZOOM LENS

BACKGROUND OF THE INVENTION

1. Field of the Invention

This invention relates to a zoom lens.

2. Related Background Art

Generally in a zoom lens, focusing is effected by that lens group thereof which is most adjacent to the object side being moved. This focusing method is still used in many zoom lenses because in a zooming range for objects on the same distance, focusing can be accomplished by a substantially constant amount of movement and moreover the structure of the lens barrel can be constructed relatively simply.

However, that lens group of a popular zoom lens which is most adjacent to the object side requires the largest lens diameter and therefore, the zoom lens becomes heavy, and this leads to the disadvantage that in case of auto focusing, quick focusing becomes difficult.

So, in recent years, the lighter weight of a lens group for focusing has been desired with the spread of auto focus cameras and various focusing systems have been proposed.

Zoom lenses disclosed, for example, in Japanese Laid-Open Patent Application No. 52-109952, Japanese Laid-Open Patent Application No. 56-21112, Japanese Laid-Open Patent Application No. 57-4018 and Japanese Laid-Open Patent Application No. 1-204013 are known.

In the zoom lens disclosed in the above-mentioned Japanese Laid-Open Patent Application No. 52-109952, focusing is effected by a part of that lens group thereof which is most adjacent to the object side being moved, and in a zooming range for objects on the same distance, focusing can be accomplished by a substantially constant amount of movement and the structure of the lens barrel can be constructed relatively simply. However, the full length of the lens group which is most adjacent to the object side is increased and a movable lens for focusing is disposed in the lens group of large lens diameter which is most adjacent to the object side, and this leads to the disadvantage that a great decrease in the weight of the focusing group cannot be very much expected. In the zoom lens of Japanese Laid-Open Patent Application No. 56-21112, focusing is effected by some of lens groups posterior of the object side lens group being moved, and in a zooming range for objects on the same distance, focusing can be accomplished by a substantially constant amount of movement and the structure of the lens barrel can be made relatively simple. However, this zoom lens is restricted to the four-group afocal zoom lens type and is not popular.

Also, in the focusing system disclosed in Japanese Laid-Open Patent Application No. 57-4018, any other lens group than that lens group which is most adjacent to the object side is used as a focusing group. Therefore, the amount of movement differs depending on each vari-focused state for objects on the same distance. Specifically, focusing is effected by the use of a zooming cam and a focusing cam which are function-approximated to each other in the correction of the amount of movement. This method has the feature that a group small in the fluctuation of a short distance or a group small in weight can be freely selected, but has the disadvantage that the structure of the lens barrel becomes complicated.

A system for an integral lens type camera is disclosed in Japanese Laid-Open Patent Application No. 1-204013. This is a system in which each vari-focused state is read by an electrical signal and an amount of movement conforming thereto is found. This system also has the feature that a group small in the fluctuation of a short distance or a group small in weight can be freely selected, but has the disadvantage that it cannot be used as a zoom lens for a single-lens reflex camera of the manual focusing type.

Further, in a lens exclusively for auto focusing or the like, when the correction of the amount of movement is effected in accordance with the focal length within the zooming range, it is preferable that the following condition be satisfied in the entire zooming range:

$|\beta_F| > 1.8$    CONDITION (2)

The above-mentioned substantially afocal system refers to a lens system in a state in which the lateral magnification $\beta_F$ of a first sub-group in a second lens group in case of an infinity state is $|\beta_F| \geq 100$.

When optical systems approximate to each other in small thickness are supposed, in succession from the object side, a lens group on the object side which is not concerned in focusing is defined as (A), a focusing lens group concerned in focusing is defined as (F) and on the image side, a lens group on the image side which is not concerned in focusing is defined as (B). The focal length of the lens group (A) on the object side which is not concerned in focusing is defined as $f_A$, the focal length of the focusing lens group (F) is defined as $f_F$, the lateral magnification of the focusing lens group (F) when the photographing distance is infinity is defined as $\beta_F$, the photographing distance (the distance between object images) is defined as R, and the amount of movement by which the focusing lens group (F) is moved to be focused on an object at the photographing distance R is defined as $\Delta x$ (the movement from the object side to the image side is positive). Also, the length of the entire lens system is defined as TL (the length from the object side principal point to the image plane of the lens group (A) on the object side).

When the distance from the object side principal point of the lens group (A) on the object side to the object is $D_0$, the amount of movement $\Delta x$ for focusing is expressed by the following equation I as described in a publication *Optics*, Vol. 12, No. 5, October, 1983, pp. 359–366 ("The New Focusing System for Zoom Lens").

EQUATION (I)
$$(R - TL - f_A)\Delta x = (D_0 - f_A)\Delta x = \frac{f_A^2(\Delta x + \beta_F \times f_F)}{\Delta x \{\Delta x + (\beta_F^2 - 1) \times (f_F/\beta_F)\}}$$

SUMMARY OF THE INVENTION

Accordingly, it is an object of the present invention to eliminate the disadvantages peculiar to the focusing systems in the above-described zoom lenses according to the prior art and to enable a new focusing system which effects focusing by lens units other than the lens unit which is most adjacent to the object side being moved and yet which is light in weight and advantageous for auto focusing and can further cope with manual focusing to be realized by simple lens barrel structure.

A zoom lens according to the present invention includes at least two lens groups, i.e., a first lens group and a second lens group. The second lens group includes a first sub-group near to the first lens group and a second sub-group far from the first lens group, and the first lens group and the first sub-group in the second lens group together form a substantially afocal system which will be described later in detail in at least a portion of the zooming range. In this zoom lens, focusing is effected by the first sub-group in the second lens group being moved along the optical axis.

Considering a case where this zoom lens is applied for auto focusing, it is preferable that the first lens group be disposed on that side in the lens group which is most adjacent to the object side.

Further, to effect more effective focusing, it is preferable that the following condition be satisfied in the entire zooming range:

$$|\beta_F| > 3.3, \qquad \text{CONDITION (1)}$$

where $|\beta_F|$ is the absolute value of the lateral magnification $\beta_F$ of the first sub-group in the second lens group in an infinity state.

Further, equation (I) can be approximately rewritten into the following equation (II):

$$(D_0 - f_A)\Delta x \simeq \frac{f_A^2 \times \beta_F^2}{(\beta_F^2 - 1)} \qquad \text{EQUATION (II)}$$

When $\beta_F$ is infinity or sufficiently great, equation (I) and equation (II) can be approximately rewritten into the following equation (III):

$$(D_0 - f_A)\Delta x = f_A^2 \qquad \text{EQUATION (III)}$$

A case where as in the present invention, the second lens group is divided into first and second sub-groups and in the vari-focused state of at least a portion in the zooming range from the wide angle end to the telephoto end, the first lens group and the first sub-group in the second lens group together form a substantially afocal system and the first sub-group in the second lens group is moved along the optical axis corresponds to a case where the lateral magnification $\Delta_F$ of the first sub-group in the above-mentioned equation (I) or (II) is infinity or sufficiently great. Thus, in such case, equation (III) is established.

In the present invention, the focal length $f_A$ of the lens group (A) on the object side is equal to an invariable value $f_1$ during vari-focusing, and equation (III) becomes $$(D_0 - f_1)\Delta x = f_1^2 = \text{constant.} \qquad \text{EQUATION (IV)}$$

Next, considering that the variation in the distance $D_0$ from the object side principal point of the lens group (A) on the object side to the object by vari-focusing at the same photographing distance is relatively small, equation (IV) can be approximated as follows:

$$\Delta x = f_1^2/(D_0 - f_1) = \text{constant} \qquad \text{EQUATION (V)}$$

Thus, when the lateral magnification $\beta_F$ is sufficiently great in all the zooming range from the wide angle end to the telephoto end, equation (V) is established in all the zooming range.

The amount of movement of the first sub-group in the second lens group can be made substantially constant in the entire zooming range. Therefore, even if the amount of movement is made constant, the amount of movement of the image plane in vari-focusing will pose no problem in practical use, and the hardware structure of the first lens group of the present invention can be made as simple as the hardware structure of the movement of the lens group on the object side in the prior-art zoom lens.

Also, when the zoom lens of the present invention is used for auto focusing or the like, if the first lens group is disposed most adjacent to the object side, the weight of the focusing group can be made very light because the effective diameter of the second lens group is very small as compared with that of the first lens group and moreover the second lens group is divided into the first sub-group for focusing and the second sub-group for non-focusing, and this is very advantageous for focusing by auto focusing.

When manual focusing is considered, it is desirable that the aforementioned CONDITION (1) be satisfied in the entire zooming range.

If the range of CONDITION (1) is exceeded, the amount of movement of the image plane in the vari-focusing when the amount of movement is made constant will become too great and it will become necessary to effect cam correction or the like to thereby vary the amount of movement. Also, in case of a zoom lens for a manual focusing type single lens reflex camera, the structure of the hardware becomes complicated, and this is not preferable.

However, if the correction of the amount of movement is possible even if CONDITION (1) is exceeded, the focusing group can be made very light in weight, and this is suitable as a focusing system for auto focusing. So, when the correction of the amount of movement is taken into account, it is desirable that the aforementioned CONDITION (2) be satisfied.

If the range of CONDITION (2) is exceeded, it will be possible to vary the amount of movement by cam correction or the like, but the lens spacing necessary for focusing will further widen and the full length of the lens will become great, and this is not preferable.

Further, it is desirable that the following condition be satisfied when the focusing according to the present invention is effected:

$$4 < f_1(f_1 + d_{F,R})/(d_{F,R} \times f_T) < 15, \qquad (3)$$

where $d_{F,R}$: the space between the first sub-group and the second sub-group in the second lens group during the infinity state;

$f_1$: the focal length of the first lens group;

$f_T$: the focal length of the entire system at the telephoto end.

Conditional expression (3) is concerned with the focal length of the first lens group and the space between the first sub-group and the second sub-group in the second lens group during the infinity state.

If the upper limit of conditional expression (3) is exceeded, the space necessary for focusing will be deficient and therefore, the close-up photographing distance will become long, and this is not preferable. Even if the space is secured, the refractive power of the first lens group will become weak and it will become difficult to assume a good zoom disposition and it will also become difficult to well balance the fluctuations of various aberrations during vari-focusing. If conversely, the lower limit of conditional expression (3) is exceeded, the space necessary for focusing can be sufficiently secured, but the full length will become great, and this is not preferable. If the increase in the full length is suppressed, the refractive power of the first lens group will become strong and it will become difficult to assume a preferable zoom disposition and it will also become difficult to well balance the fluctuations of various aberrations during vari-focusing.

Embodiments of the present invention will hereinafter be described with reference to the accompanying drawings.

DETAILED DESCRIPTION OF THE PREFERRED EMBODIMENTS

Figure 1:
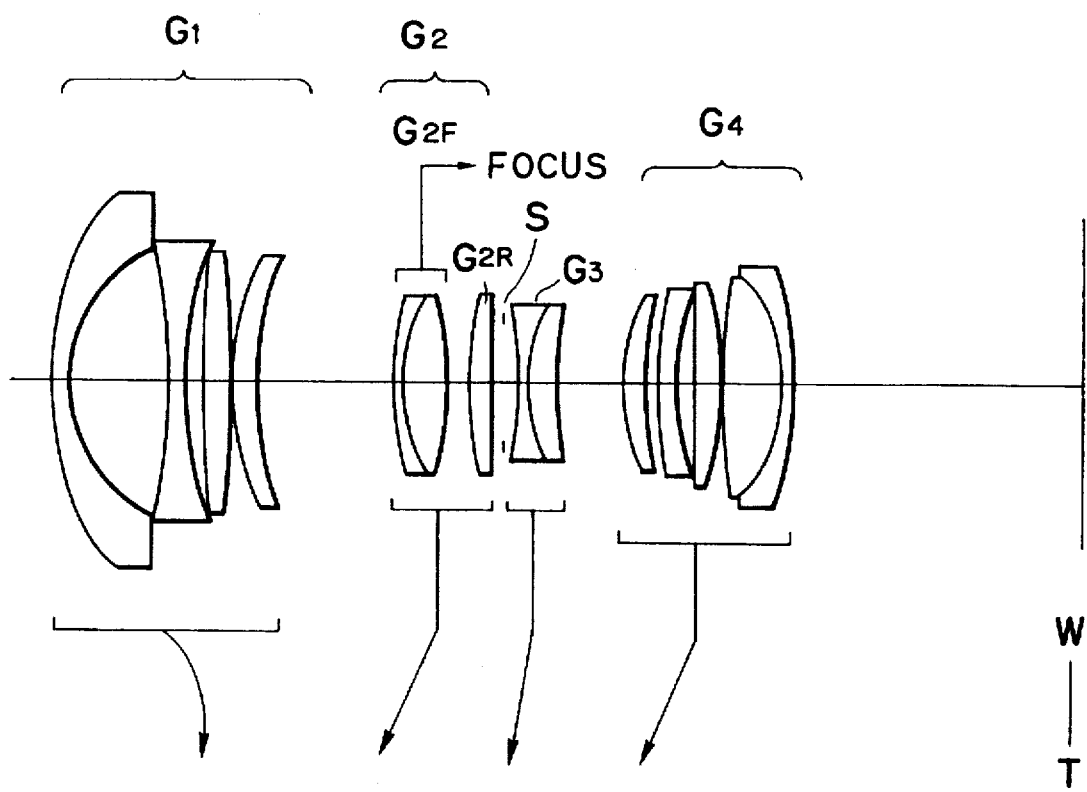
FIG. 1 shows the lens construction of a first embodiment of the zoom lens of the present invention.

FIG. 1 shows the lens construction of a first embodiment.

The zoom lens of the first embodiment comprises, in succession from the object side, a first lens group G1 comprising a negative meniscus lens having its convex surface facing the object side, a biconcave lens, a biconvex lens and a positive meniscus lens having its convex surface facing the object side, and having negative refractive power as a whole, a second lens group G2 comprising a front group (hereinafter referred to as the focusing group G2F) comprising a cemented lens, and a rear group G2R comprising a positive meniscus lens having its convex surface facing the object side, and having positive refractive power as a whole, a stop S, a third lens group G3 comprising a cemented lens, and a fourth lens group G4 comprising a positive meniscus lens having its convex surface facing the object side, a negative meniscus lens having its convex surface facing the object side, a biconvex lens and a cemented lens.

Figure 2:
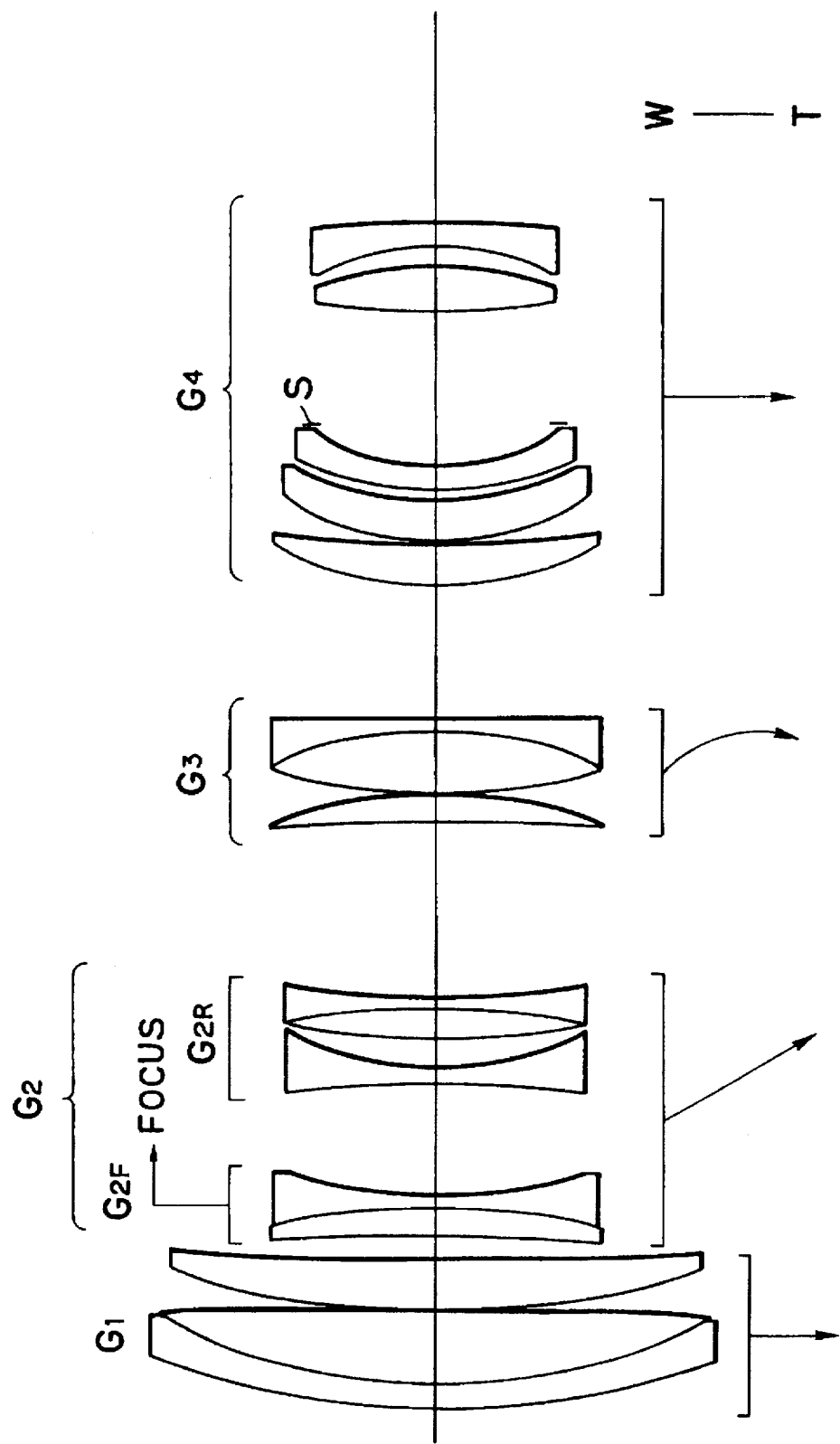
FIG. 2 shows the lens construction of a second embodiment of the zoom lens of the present invention.

FIG. 2 shows the lens construction of a second embodiment.

The zoom lens of the second embodiment comprises, in succession from the object side, a first lens group G1 comprising a cemented lens and a positive meniscus lens having its convex surface facing the object side, and having positive refractive power as a whole, a second lens group G2 comprising a front group (hereinafter referred to as the focusing group G2F) comprising a cemented lens, and a rear group G2R comprising a cemented lens and a biconcave lens, and having negative refractive power as a whole, a third lens group G3 comprising a positive meniscus lens having its concave surface facing the object side and a cemented lens, and a fourth lens group G4 comprising a positive meniscus lens having its convex surface facing the object side, a positive meniscus lens having its convex surface facing the object side, a negative meniscus lens having its convex surface facing the object side, a biconvex lens and a negative meniscus lens having its concave surface facing the object side.

From each embodiment, it is seen that the arrangement of the refractive powers of the first lens group G1 and the second lens group G2 may be negative and positive, or positive and negative.

The numerical data of the respective embodiments of the present invention will be shown in Tables 1 and 2 below. In these tables, the numbers at the left end represent the order from the object side, r represents the radius of curvature of each lens surface, d represents the spacing between adjacent lens surfaces, the refractive index n and Abbe number ν are values for d-line ($\lambda$=587.6 nm). FN represents F number, $2\omega$ represents the angle of view, $d_0$ represents the distance from the object to the lens surface which is most adjacent to the object side, Bf represents the back focal length, and $\beta$ is a value for the photographing magnification. Also, the shape of the aspherical surface is expressed by the following equation:

$$X(h) = \frac{h^2/r}{1+(1-kh^2/r^2)^{1/2}} + \sum_{i=1}^{5} (C_{2i} \times h^{2i})$$

where h: the height from the optical axis;

X(h): the distance in the direction of the optical axis to the tangential plane of the aspherical surface at the height h from the optical axis;

r: the paraxial radius of curvature;

k: cone constant;

$C_{2i}$: the 2ith order aspherical surface coefficient.

TABLE 1

(Numerical Data of First Embodiment)
f = 20.5–34.0,
FN = 2.89,
$2\omega$ = 95.2°–64.6°

| | r | d | ν | n |
|---|---|---|---|---|
| 1 | 49.529 | 2.50 | 49.4 | 1.77279 |
| 2 | 19.409 | 13.00 | | |
| 3 | −82.454 | 2.00 | 47.5 | 1.78797 |
| 4 | 38.992 | 2.80 | | |
| 5 | 153.969 | 4.00 | 31.6 | 1.75692 |
| 6 | −153.969 | 0.20 | | |
| 7 | 34.815 | 3.50 | 31.6 | 1.75692 |
| 8 | 51.692 | (d8 = variable) | | |
| 9 | 43.020 | 1.20 | 29.5 | 1.71736 |
| 10 | 22.359 | 5.50 | 69.9 | 1.51860 |
| 11 | −56.755 | (d11 = variable) | | |
| 12 | 48.361 | 3.00 | 53.9 | 1.71300 |
| 13 | 436.187 | (d13 = variable) | | |
| 14 | −63.760 | 1.20 | 52.3 | 1.74810 |
| 15 | 22.250 | 4.00 | 25.4 | 1.80518 |
| 16 | 76.693 | (d16 = variable) | | |
| 17 | 28.759 | 3.00 | 50.8 | 1.65844 |
| 18 | 68.431 | 1.50 | | |
| 19 | 67.908 | 2.00 | 26.1 | 1.78470 |
| 20 | 27.642 | 2.50 | | |
| 21 | 2058.323 | 4.00 | 45.4 | 1.79668 |
| 22 | −50.144 | 0.20 | | |
| 23 | 105.997 | 8.00 | 57.0 | 1.62280 |
| 24 | −20.350 | 1.70 | 23.0 | 1.86074 |
| 25 | −44.631 | (Bf = variable) | | |

(variable spacing for vari-focusing)

| f | 20.5000 | 28.0000 | 34.0000 |
|---|---|---|---|
| $d_0$ | ∞ | ∞ | ∞ |
| $d_8$ | 17.8289 | 6.3818 | 1.5051 |
| $d_{11}$ | 3.3045 | 3.3045 | 3.3045 |
| $d_{13}$ | 3.5982 | 8.1846 | 11.7305 |
| $d_{16}$ | 9.1470 | 4.5606 | 1.0148 |
| Bf | 38.5995 | 45.1515 | 50.2170 |
| β | −0.0518 | −0.0703 | −0.0857 |
| $d_0$ | 361.7220 | 366.6170 | 366.4282 |
| $d_8$ | 19.9364 | 8.3602 | 3.5272 |
| $d_{11}$ | 1.2969 | 1.3261 | 1.2824 |
| $d_{13}$ | 3.5982 | 8.1846 | 11.7305 |
| $d_{16}$ | 9.1470 | 4.5606 | 1.0148 |
| Bf | 38.5995 | 45.1515 | 50.2170 |

(the aspherical surface coefficient of the first surface)

| | |
|---|---|
| cone constant: | k = 0.1000 × 10 |
| aspherical surface constant: | $C_2$ = 0.0000 |
| | $C_4$ = 0.4780 × 10$^{-5}$ |
| | $C_6$ = 0.4468 × 10$^{-8}$ |
| | $C_8$ = −0.7609 × 10$^{-11}$ |
| | $C_{10}$ = 0.1215 × 10$^{-13}$ |

(condition-corresponding numerical values)

| | |
|---|---|
| (1) | $|\beta_F|_{Min}$ = 5.858 |
| (3) | $f_1(f_1 + d_{F,R})/(d_{F,R} \times f_T)$ = 7.796 |

TABLE 2

(Numerical Data of Second Embodiment)
f = 82.0–196.0,
FN = 2.89,
$2\omega$ = 30.1°–12.2°

| | r | d | ν | n |
|---|---|---|---|---|
| 1 | 102.933 | 3.00 | 25.4 | 1.80518 |
| 2 | 72.817 | 10.30 | 82.6 | 1.49782 |

TABLE 2-continued (Numerical Data of Second Embodiment)
f = 82.0–196.0,
FN = 2.89,
2ω = 30.1°–12.2°

| | | | | |
|---|---|---|---|---|
| 3 | −1208.506 | 0.20 | | |
| 4 | 107.315 | 7.20 | 82.6 | 1.49782 |
| 5 | 1107.838 | (d5 = variable) | | |
| 6 | −427.809 | 3.90 | 35.7 | 1.62588 |
| 7 | −82.554 | 1.60 | 60.1 | 1.62041 |
| 8 | 63.036 | (d8 = variable) | | |
| 9 | −120.975 | 1.50 | 64.1 | 1.51680 |
| 10 | 38.555 | 4.50 | 25.5 | 1.80458 |
| 11 | 129.984 | 3.50 | | |
| 12 | −94.774 | 1.60 | 53.9 | 1.71300 |
| 13 | 122.725 | (d13 = variable) | | |
| 14 | −496.023 | 4.50 | 60.3 | 1.51835 |
| 15 | −57.366 | 0.20 | | |
| 16 | 78.171 | 8.50 | 60.7 | 1.56384 |
| 17 | −50.040 | 1.70 | 31.6 | 1.75692 |
| 18 | −1381.323 | (d18 = variable) | | |
| 19 | 42.137 | 6.00 | 82.6 | 1.49782 |
| 20 | 155.005 | 0.22 | | |
| 21 | 32.919 | 6.00 | 59.7 | 1.53996 |
| 22 | 41.016 | 1.00 | | |
| 23 | 39.546 | 3.27 | 25.5 | 1.80458 |
| 24 | 27.620 | 21.95 | | |
| 25 | 115.322 | 6.00 | 40.3 | 1.60717 |
| 26 | −46.951 | 2.63 | | |
| 27 | −33.211 | 3.27 | 45.0 | 1.74400 |
| 28 | −139.379 | (Bf = variable) | | |

(variable spacing for vari-focusing)

| f | 81.9953 | 134.9969 | 195.9952 |
|---|---|---|---|
| $d_0$ | ∞ | ∞ | ∞ |
| $d_5$ | 3.1983 | 28.3818 | 40.5070 |
| $d_8$ | 16.6627 | 16.6627 | 16.6627 |
| $d_{13}$ | 24.5540 | 14.8062 | 3.5877 |
| $d_{18}$ | 18.5793 | 3.1436 | 2.2369 |
| Bf | 59.4549 | 59.4548 | 59.4546 |
| β | −0.0507 | −0.0809 | −0.1157 |
| $d_0$ | 1775.0088 | 1775.0089 | 1775.0091 |
| $d_5$ | 12.8409 | 37.6425 | 50.1466 |
| $d_8$ | 7.0201 | 7.4020 | 7.0231 |
| $d_{13}$ | 24.5540 | 14.8062 | 3.5877 |
| $d_{18}$ | 18.5793 | 3.1436 | 2.2369 |
| Bf | 59.4549 | 59.4548 | 59.4546 |

(condition-corresponding numerical values)

| | |
|---|---|
| (1) | $|\beta_F|_{Min}$ = 4.688 |
| (3) | $f_1(f_1 + d_{F,R})/(d_{F,R} \times f_T)$ = 5.300 |

From each embodiment, it is apparent that the focusing group G2F is compact and the amount of movement of the focusing group G2F at the same photographing distance is substantially constant irrespective of each vari-focused position.

What is claimed is:

1. A zoom lens comprising, in the following order from the object side:
   a first lens group having negative refractive power;
   a second lens group including a first sub-group having positive refractive power near to said first lens group and a second sub-group far from said first lens group, said first lens group and said first sub-group in said second lens group together forming a substantially afocal system in at least a portion of a zooming range;
   a third lens group; and
   a fourth lens group;
   wherein said second lens group is moved along the optical axis during zooming and said first sub-group in said second lens group is moved along the optical axis to thereby effect focusing.

2. A zoom lens according to claim 1, satisfying the following condition in the whole of the zooming range:

$|\beta_F| > 3.3$, where $|\beta_F|$ represents the absolute value of the lateral magnification $\beta_F$ of the first sub-group in said second lens group in an infinity state.

3. A zoom lens according to claim 1, satisfying the following condition in the whole of the zooming range:

$|\beta_F| > 1.8$, where $|\beta_F|$ represents the absolute value of the lateral magnification $\beta_F$ of the first sub-group in said second lens group in an infinity state.

4. A zoom lens according to claim 2, wherein the spacing between the first and second sub-groups is fixed during zooming and wherein the following condition is satisfied:

$4 < f_1(f_1 + d_{F,R})/(d_{F,R} \times f_T) < 15$, where $d_{F,R}$: the spacing between the first sub-group and the second sub-group in the second lens group during an infinity state;

$f_1$: the focal length of the first lens group;

$f_T$: the focal length of the entire optical system, at the telephoto end.

5. A zoom lens according to claim 1, wherein said first lens group is closest to the object side.

6. In a zoom lens having a first lens portion having negative refractive power closest to an object side and a second lens portion closest to an image side, the improvement wherein the second lens portion includes a lens unit that is closest to said first lens portion, that is movable along the optical axis to effect focusing, that has positive refractive power, and that forms with said first lens portion a substantially afocal system in at least a portion of a zooming range.

7. A zoom lens according to claim 6, wherein said lens unit that is closest to said first lens portion is movable along the optical axis during zooming.

8. A zoom lens comprising in the following order from the object side:
   a first lens unit having negative refractive power;
   a focusing lens unit having positive refractive power, movable along the optical axis during zooming, and movable along the optical axis to effect focusing; and
   an imaging lens unit;
   wherein said first lens unit and said focusing lens unit form a substantially afocal system in at least a portion of a zooming range,
   wherein said first lens unit is closest to the object side.

* * * * *